US009891243B2

(12) United States Patent
Hong

(10) Patent No.: US 9,891,243 B2
(45) Date of Patent: Feb. 13, 2018

(54) APPARATUS AND METHOD FOR DETECTING WRIST STEPS

(71) Applicant: LG ELECTRONICS INC., Seoul (KR)

(72) Inventor: Gyuseog Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 375 days.

(21) Appl. No.: 14/683,209

(22) Filed: Apr. 10, 2015

(65) Prior Publication Data

US 2016/0025766 A1    Jan. 28, 2016

(30) Foreign Application Priority Data

Jul. 22, 2014   (KR) .................. 10-2014-0092750

(51) Int. Cl.
   *G01P 15/00*   (2006.01)
   *G01C 22/00*   (2006.01)
(52) U.S. Cl.
   CPC ............ *G01P 15/00* (2013.01); *G01C 22/006* (2013.01)
(58) Field of Classification Search
   CPC ...... G06F 3/0482; G06F 1/163; G06F 1/1635; G06F 11/323; G06F 11/3409; G06F 19/322; G06F 19/3418; G06F 19/3431; G06F 19/3481; G06F 2009/45591; G06F 2201/815; G06F 3/0484; G06F 9/45533; G06F 17/03; G06F 3/0637; G06F 3/067; G06F 3/0673; G06F 3/1415; G06F 3/1454; G06F 9/54; H04L 67/12; H04L 41/22; H04L 63/1433; H04L 67/10;

(Continued)

(56) References Cited

U.S. PATENT DOCUMENTS 6,611,714 B1 * 8/2003 Mo ...................... A61N 1/3622
                                                     607/27
2005/0240375 A1   10/2005 Sugai
2014/0270375 A1 * 9/2014 Canavan ............ A63B 24/0062
                                                     382/103

FOREIGN PATENT DOCUMENTS

CN        1165573       11/1997
CN        1690660       11/2005
(Continued)

OTHER PUBLICATIONS

European Search Report dated Dec. 17, 2015 issued in Application No. 15163108.2.

(Continued)

*Primary Examiner* — Roy Y Yi
(74) *Attorney, Agent, or Firm* — KED & Associates, LLP

(57) ABSTRACT

Disclosed are an apparatus for detecting wrist steps and a method thereof, which can exactly detect a user wrist step based on a plurality of acceleration signals. The apparatus includes an acceleration sensor, a controller and a display unit. The acceleration sensor detects a plurality of acceleration signals corresponding to a plurality of axis directions. The controller detects a plurality of wrist step feature points corresponding to the plurality of acceleration signals, detects time periods between the plurality of wrist step feature points, selects any one acceleration signal among the plurality of acceleration signals based on a standard deviation of the time periods, and detects wrist steps corresponding to the selected acceleration signal. The display unit displays the wrist steps.

17 Claims, 7 Drawing Sheets

(58) Field of Classification Search
CPC ............... H04L 43/045; H04L 43/0811; H04L 43/0817; H04L 43/0876
See application file for complete search history.

(56) References Cited

FOREIGN PATENT DOCUMENTS

| | | |
|---|---|---|
| CN | 103477192 | 12/2013 |
| WO | WO 2012/119126 A2 | 9/2012 |
| WO | WO 2012/135726 A1 | 10/2012 |

OTHER PUBLICATIONS

Chinese Office Action dated Jul. 20, 2017 issued in Application No. 201510259407.0.

* cited by examiner

APPARATUS AND METHOD FOR DETECTING WRIST STEPS

CROSS-REFERENCE TO RELATED APPLICATIONS

Pursuant to 35 U.S.C. § 119(a), this application claims the benefit of earlier filing date and right of priority to Korean Application No. 10-2014-0092750, filed on Jul. 22, 2014, the contents of which is incorporated by reference herein in its entirety.

BACKGROUND

1. Field

The present disclosure relates to an apparatus for counting steps based on wrist movements and a method thereof.

2. Background

Apparatuses and methods for detecting steps based on movement of a user's wrist are known. However, they suffer from various disadvantages.

SUMMARY

An apparatus worn on a wrist of a user may count steps using detected movement of the wrist. A step detected based on wrist movement is referred to herein as a wrist step, and may be used interchangeably. Many conventional methods count steps based on one acceleration signal. However, because the motion of a person's wrist varies depending on a person's posture (e.g., walking, running, sitting, etc.), step counts based on one acceleration signal results in unacceptable inaccuracies. Accordingly, an improved apparatus and method for detecting wrist steps is needed.

To achieve these and other advantages and in accordance with the purpose of this specification, as embodied and broadly described herein, an apparatus for detecting wrist steps, which is wearable on a user's wrist may include: an acceleration sensor configured to detect a plurality of acceleration signals corresponding to a plurality of axis directions; a controller configured to detect a plurality of wrist step feature points corresponding to the plurality of acceleration signals, detect time periods between the plurality of wrist step feature points, select any one acceleration signal among the plurality of acceleration signals based on a standard deviation (SD) of the time periods, and detect wrist steps corresponding to the selected acceleration signal; and a display unit configured to display the wrist steps.

In one exemplary embodiment, the plurality of acceleration signals may include acceleration signals corresponding to X-axis, Y-axis and Z-axis directions, and combinations of acceleration signals corresponding to the X-axis, Y-axis and Z-axis directions.

In one exemplary embodiment, the controller may detect peak values of the plurality of acceleration signals as the plurality of wrist step feature points.

In one exemplary embodiment, the any one acceleration signal may be an acceleration signal having the minimum SD among the plurality of acceleration signals.

In one exemplary embodiment, the controller may detect first wrist step feature points corresponding to a first acceleration signal among the plurality of acceleration signals; detect second wrist step feature points corresponding to a second acceleration signal among the plurality of acceleration signals; detect first time periods between the first wrist step feature points; detect second time periods between the second wrist step feature points; and select the any one acceleration signal among the first and second acceleration signals based on a difference between a first SD of the first time periods and a second SD of the second time period.

In one exemplary embodiment, the any one acceleration signal may be an acceleration signal having the minimum SD among the first and second SD.

In one exemplary embodiment, if the SD of the specific time periods between the first wrist step feature points is greater than that of the specific time periods between the second wrist step feature points while the first wrist step feature points are being counted as first wrist steps, the controller may count the second wrist step feature points corresponding to the specific time periods as the first wrist steps.

In one exemplary embodiment, the controller may detect wrist steps corresponding to peak values exceeding a reference value among peak values of the selected acceleration signal.

In one exemplary embodiment, the controller may change the wrist steps into a number of paces, and display the number of paces on the display unit.

In one exemplary embodiment, the controller may recognize whether a user's current posture is a walking or running posture based on a signal pattern of the plurality of acceleration signals.

In one exemplary embodiment, if the pattern of the plurality of acceleration signals is identical or similar to a previously stored walking posture pattern, the controller may recognize that the user's current posture is the walking posture. If the pattern of the plurality of acceleration signals is identical or similar to a previously stored running posture pattern, the controller may recognize that the user's current posture is the running posture.

In one exemplary embodiment, the controller may recognize whether the user's current posture is the walking or running posture based on a change in gravity axis among the plurality of acceleration signals.

In one exemplary embodiment, if the user's current posture is the walking or running posture, the controller may detect wrist steps corresponding to the selected acceleration signal.

In one exemplary embodiment, if it is recognized that the user's posture is not the walking or running posture during a specific time period of the selected acceleration signal when wrist steps corresponding to the selected acceleration signal are detected, the controller may delete the wrist steps detected in the specific time period.

In one exemplary embodiment, acceleration signals selected among the plurality of acceleration signals when the current posture is the walking posture may be different from those selected among the plurality of acceleration signals when the current posture is the running posture.

To achieve these and other advantages and in accordance with the purpose of this specification, as embodied and broadly described herein, a method for detecting wrist steps in a mobile terminal wearable on a user's wrist may include: detecting a plurality of acceleration signals corresponding to a plurality of axis directions; detecting a plurality of wrist step feature points corresponding to the plurality of acceleration signals; detecting time periods between the plurality of wrist step feature points; selecting any one acceleration signal among the plurality of acceleration signals based on a SD of the time periods; detecting wrist steps corresponding to the selected acceleration signal; and displaying the wrist steps on a display unit.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWING

The accompanying drawings, which are included to provide a further understanding of the disclosure and are incorporated in and constitute a part of this specification, illustrate exemplary embodiments and together with the description serve to explain the principles of the disclosure.

In the drawings.

DETAILED DESCRIPTION OF EXEMPLARY EMBODIMENTS

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

A terminal in the present description may include a mobile terminal such as a portable phone, a smart phone, a notebook computer, a digital broadcasting terminal, Personal Digital Assistants (PDA), Portable Multimedia Player (PMP), a navigation system, a slate PC, a tablet PC, an ultra book, a wearable device (e.g., smart watch), a glass-type terminal (e.g., smart glass), a head mounted display (HMD), etc.

However, it will be obvious to those skilled in the art that the present disclosure may be also applicable to a fixed terminal such as a digital TV, a desktop computer and a digital signage, except for specific configurations for mobility.

Figure 1A:
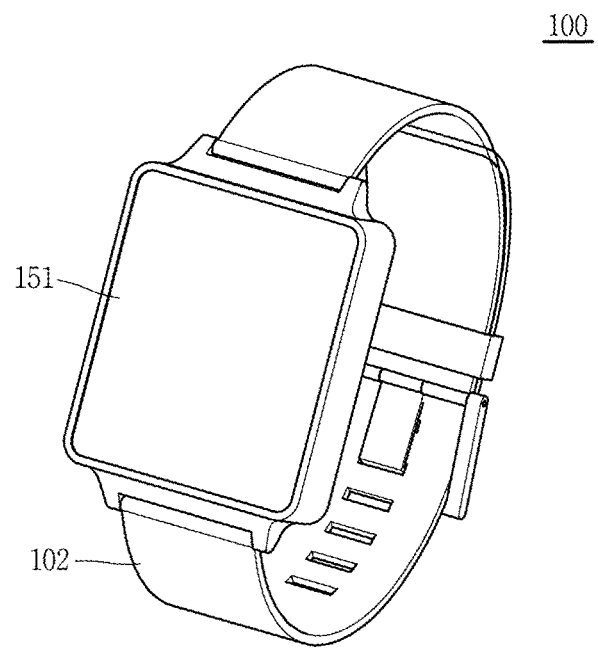
FIG. 1A is an exemplary diagram schematically illustrating a watch type mobile terminal including an apparatus for detecting wrist steps according to exemplary embodiments.
Figure 1B:
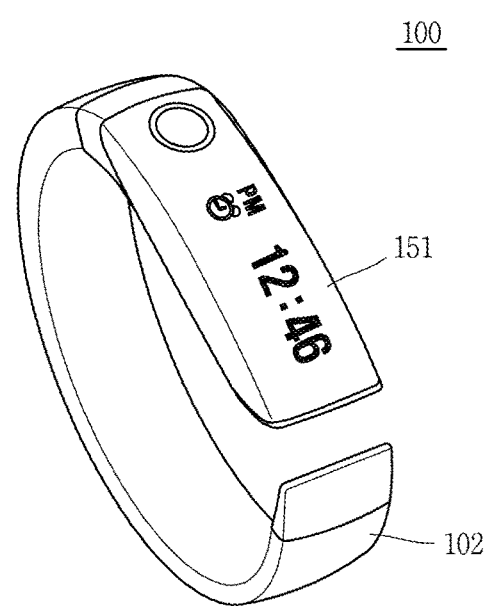
FIG. 1B is an exemplary diagram schematically illustrating a band type mobile terminal including an apparatus for detecting wrist steps according to exemplary embodiments.

Referring to FIGS. 1A and 1B, FIG. 1A is an exemplary diagram schematically illustrating a watch type mobile terminal including an apparatus for detecting wrist steps according to exemplary embodiments, and FIG. 1B is an exemplary diagram schematically illustrating a band type mobile terminal including an apparatus for detecting wrist steps according to exemplary embodiments.

The watch type or band type mobile terminal 100 includes a main body having a display unit 151 and a band 102 connected to the main body to be wearable on a wrist. The main body includes a case forming an external appearance thereof. As shown in these figures, the case forms an internal space in which various kinds of electronic components are accommodated. The apparatus (or pedometer) may be applied to the watch type or band type mobile terminal 100, but may be configured to be independently wearable on a user's wrist.

Figure 2:
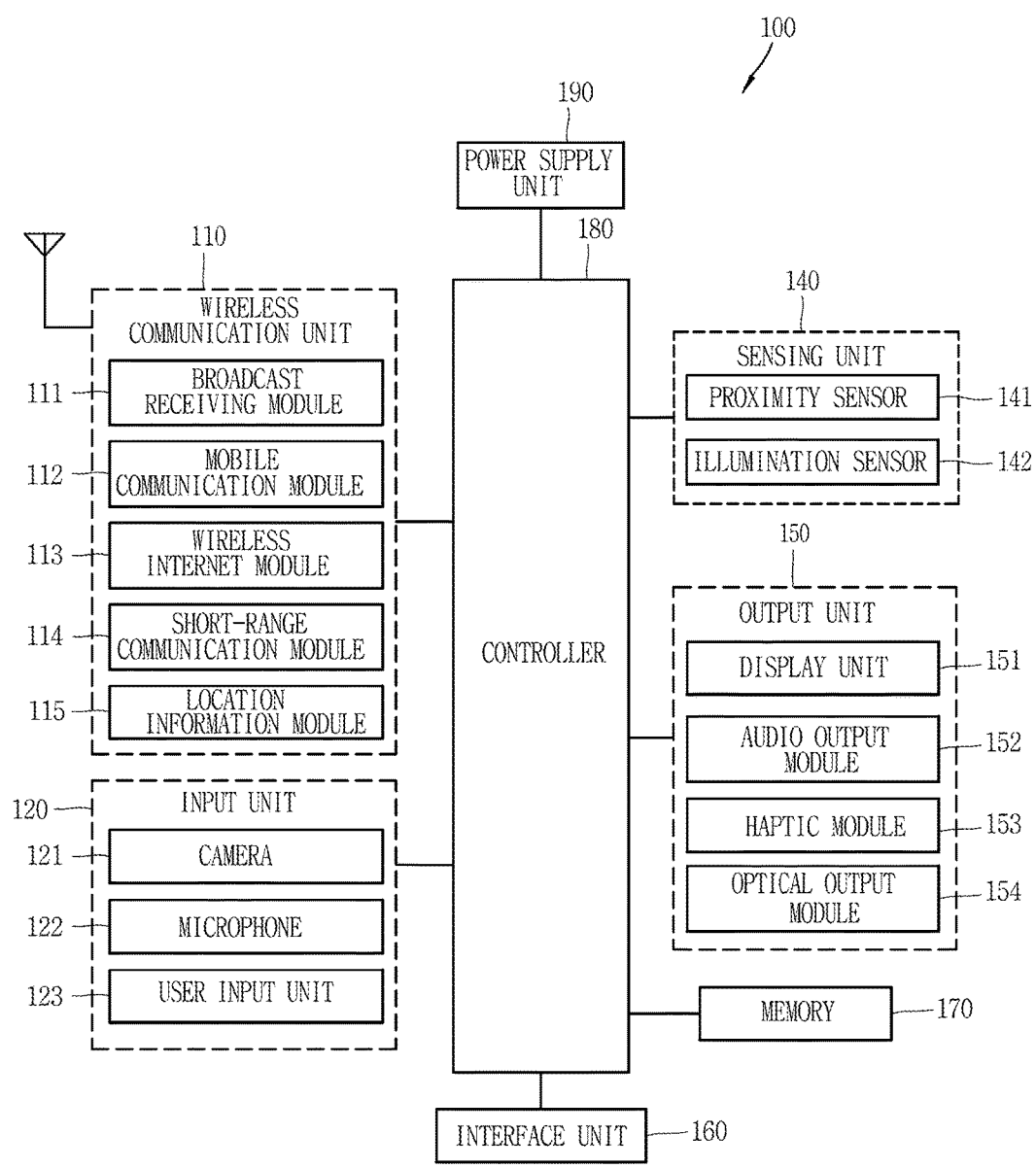
FIG. 2 is a block diagram illustrating a mobile terminal including an apparatus for detecting wrist steps according to exemplary embodiments.

FIG. 2 is a block diagram illustrating a mobile terminal including an apparatus for detecting wrist steps according to exemplary embodiments.

The mobile terminal 100 (e.g., smart phone, watch type, or band type mobile terminal) is shown having components such as a wireless communication unit 110, an input unit 120, a sensing unit 140, an output unit 150, an interface unit 160, a memory 170, a controller 180, and a power supply unit 190. It is understood that implementing all of the illustrated components of FIG. 1A is not a requirement, and that greater or fewer components may alternatively be implemented.

Referring now to FIG. 2, the wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 2, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 2, or activating application programs stored in the memory 170. As one example, the controller 180 controls some or all of the components illustrated in FIGS. 1A, 1B and 2 according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least part of the components may operate in a cooperating manner, so as to implement an operation, a control or a control method of the mobile terminal to be explained according to various embodiments. The operation, the control or the control method of the mobile terminal may be implemented on the mobile terminal, by driving of at least one application program stored in the memory.

The above components will be explained in more detail with reference to FIG. 2, before various embodiments of the mobile terminal are explained.

Referring still to FIG. 2, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), Wideband CDMA (WCDMA), High Speed Downlink Packet access (HSDPA), Long Term Evolution (LTE), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA(High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, GSM, CDMA, WCDMA, LTE and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the mobile terminal. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors.

The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Hereinafter, an apparatus and a method for detecting wrist steps, applied to a mobile terminal (e.g., a band type mobile terminal, a watch type mobile terminal, or the like), will be described.

Figure 3:
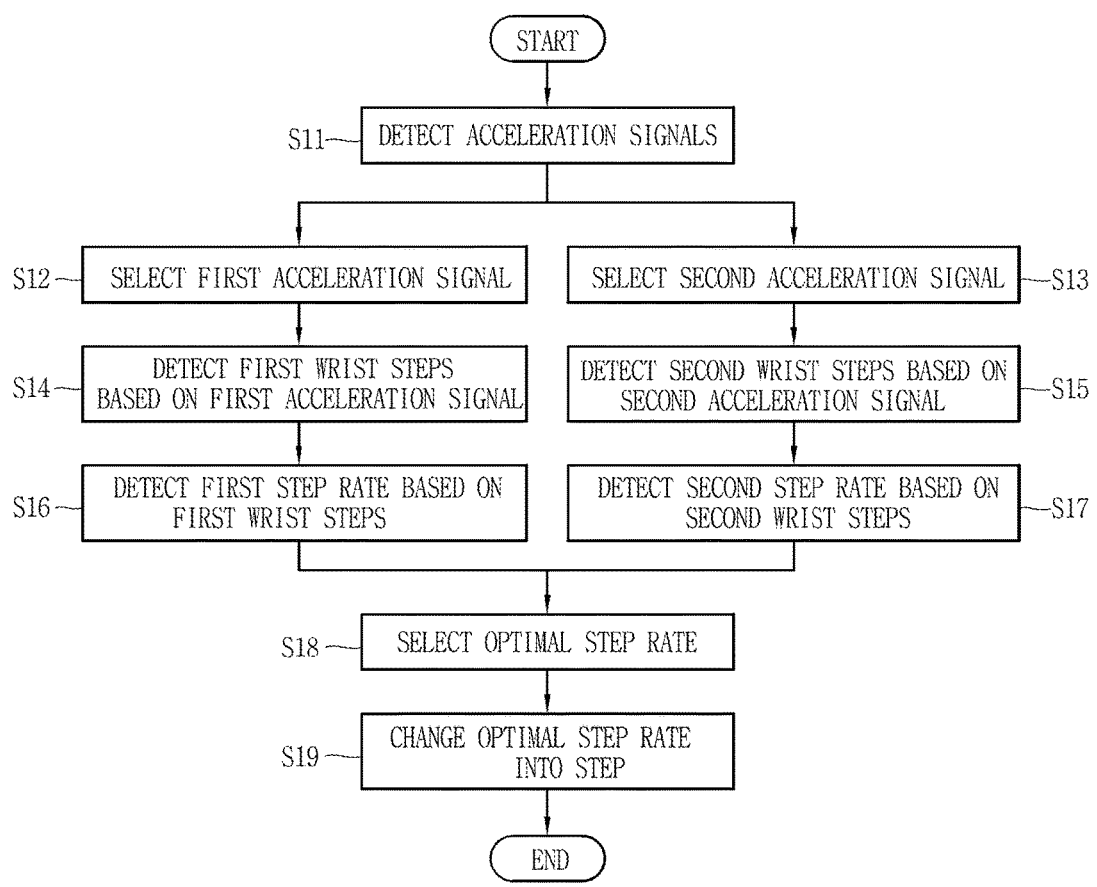
FIG. 3 is a flowchart illustrating a method for detecting wrist steps according to an exemplary embodiment.

FIG. 3 is a flowchart illustrating a method for detecting wrist steps according to an exemplary embodiment.

First, an acceleration sensor detects, in real time, a plurality of acceleration signals (e.g., three-axis (X-axis, Y-axis and Z-axis) acceleration signals), and outputs the plurality of detected acceleration signals to the controller 180 (S11).

The controller 180 receives the plurality of acceleration signals from the acceleration sensor, and selects a predetermined first acceleration signal (e.g., an X-axis acceleration signal) among the plurality of received acceleration signals (S12).

The controller 180 selects a predetermined second acceleration signal (e.g., a Y-axis acceleration signal) among the plurality of received acceleration signals (S13). The first and second acceleration signals may be set by a designer or user.

In addition to receiving the X-axis, Y-axis and Z-axis acceleration signals, the controller 180 may obtain a vector sum of the X-axis, Y-axis and Z-axis acceleration signals, and select at least two signals among the obtained vector sum and of the X-axis, Y-axis and Z-axis acceleration signals. The controller 180 may generate a plurality of acceleration signals based on combinations of the obtained vector sum and the X-axis, Y-axis and Z-axis acceleration signals.

The controller 180 may select two or more optimal acceleration signals (e.g., the predetermined first and second acceleration signals) for detecting wrist steps among the plurality of acceleration signals generated based on the combinations of the X-axis, Y-axis and Z-axis acceleration signals and the obtained vector sum.

The controller 180 detects first wrist steps (first wrist step feature points) based on the predetermined first acceleration signal (S14). For example, the controller 180 detects, as the first wrist steps (first wrist step feature points), peak values exceeding a reference value for detecting wrist steps in the predetermined first acceleration signal. These peak values in the acceleration signal that exceed the reference value are referred to herein as wrist step feature points and correlate to steps taken by the user.

The controller 180 detects second wrist steps (second wrist step feature points) based on the predetermined second acceleration signal (S15). For example, the controller 180 detects, as the second wrist steps (second wrist step feature points), peak values exceeding the reference value for detecting the wrist step in the predetermined second acceleration signal.

Figure 4:
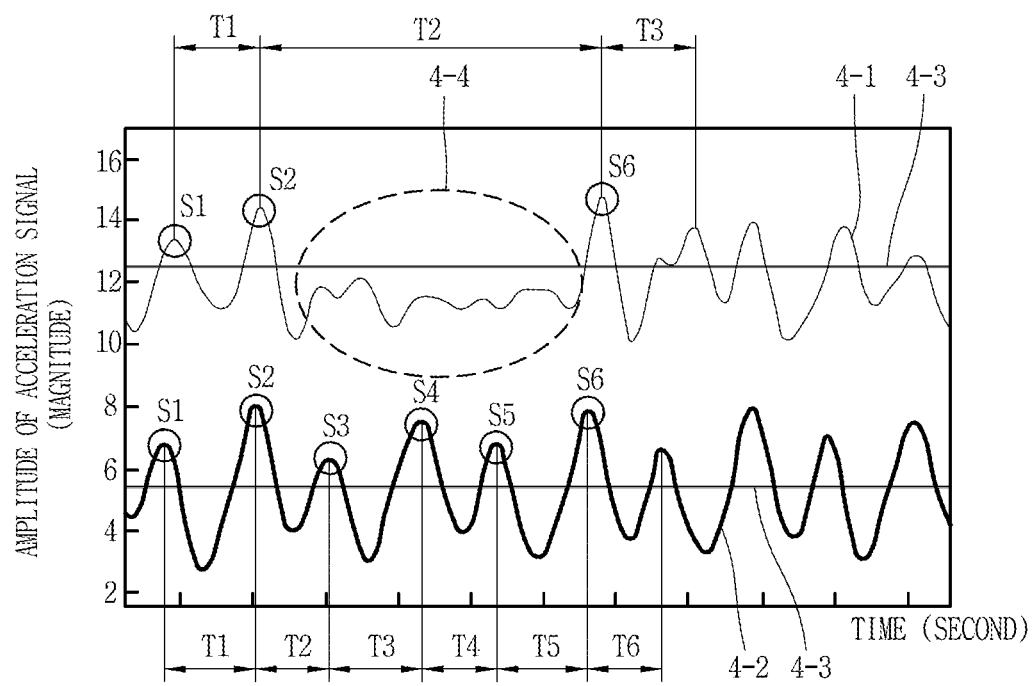
FIG. 4 is an exemplary diagram illustrating wrist steps according to exemplary embodiments.

FIG. 4 is an exemplary diagram illustrating wrist steps according to exemplary embodiments.

As shown in FIG. 4, the controller 180 detects, as the first wrist steps (S1, S2, . . . ), peak values exceeding the reference value 4-3 for detecting the wrist step in the predetermined first acceleration signal 4-1.

The controller 180 detects, as the second wrist steps (S1, S2, S3, . . . ), peak values exceeding the reference value 4-3 for detecting the wrist step in the predetermined second acceleration signal 4-2. For example, the controller 180 may count a first peak value generated in a first time period T1 as a first wrist step S1, and count a second peak value generate in a second time period T2 as a second wrist step S2. One wrist step may be identical to one user step or pace.

The controller 180 detects a first step rate (time period between steps) based on the first wrist steps (S16). For example, the controller 180 detects time periods T1, T2, T3 . . . $T_N$ between the first wrist steps, and obtains a first standard deviation (SD) of the detected time periods (also referred to as a first step rate). In FIG. 4, reference numeral 4-4 is a period in which one or more steps (peak values) is lost or missing. That is, the period 4-4 may represent an error and referred to herein as an error period.

The controller 180 detects a second step rate (time period between steps) based on the second wrist steps (S17). For example, the controller 180 detects time periods T1, T2, T3, T4, T5, T6 . . . $T_N$ between the second wrist steps, and obtains a second SD of the detected time periods (also referred to as a second step rate).

The controller 180 compares the first SD with the second SD, and selects, as an optimal step rate, the second step rate corresponding to the second SD when the second SD is smaller than the first SD as the comparison result (S18). On the other hand, the controller 180 compares the first SD with the second SD, and selects, as an optimal step rate, the first step rate corresponding to the first SD when the first SD is smaller than the second SD as the comparison result. For example, if the first SD is greater than the second SD in a specific time period 4-4 while the steps S1 and S2 are being counted based on the first step rate, the controller counts steps (e.g., S3, S4 and S5) corresponding to the specific period using the second step rate, and subsequently counts a step S6 using the first step rate. The display unit 151 sequentially displays the counted steps on a screen.

Figure 5:
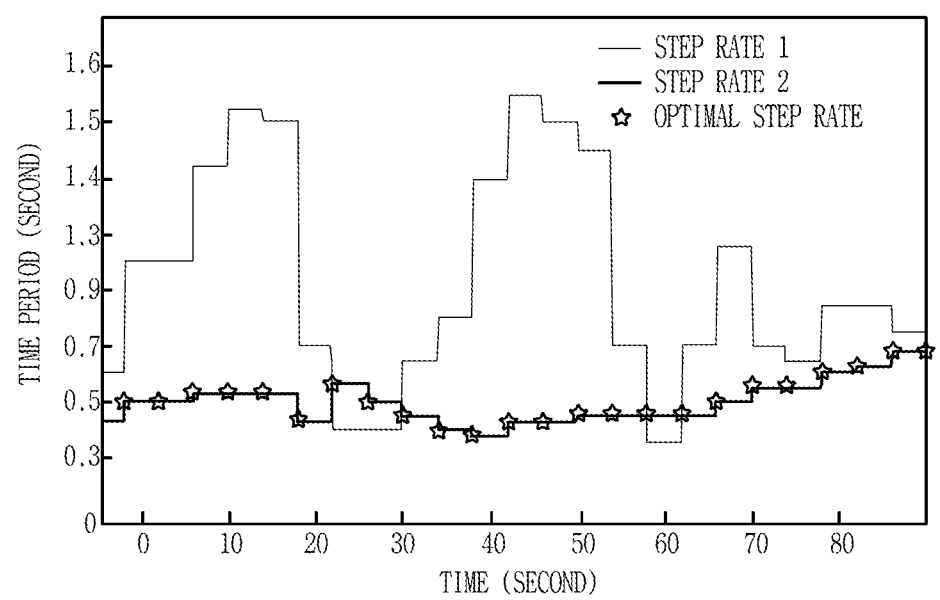
FIG. 5 is an exemplary diagram illustrating an optimal step rate according to exemplary embodiments.

FIG. 5 is an exemplary diagram illustrating an optimal step rate according to exemplary embodiments.

As shown in FIG. 5, when assuming that the second step rate (step rate 2) has a time period of average 0.5 to 0.7 seconds and the first step rate (step rate 1) has a time period of 0.7 to 1.5 seconds due to the lost period (error), the controller 180 selects, as an optimal step rate, the second step rate (step rate 2) of which SD is smaller than that of the first step rate.

The controller 180 changes the selected optimal step rate (e.g., the second step rate) as a step (S19), and calculates a number of paces based on the changed step. For example, the controller 180 changes the selected optimal step rate (e.g., the second step rate) into a number of steps, and calculates the changed number of steps (e.g., 100 steps) as a number of paces (e.g., 100 paces). The display unit 151 sequentially displays the number of paces on a screen.

Figure 6:
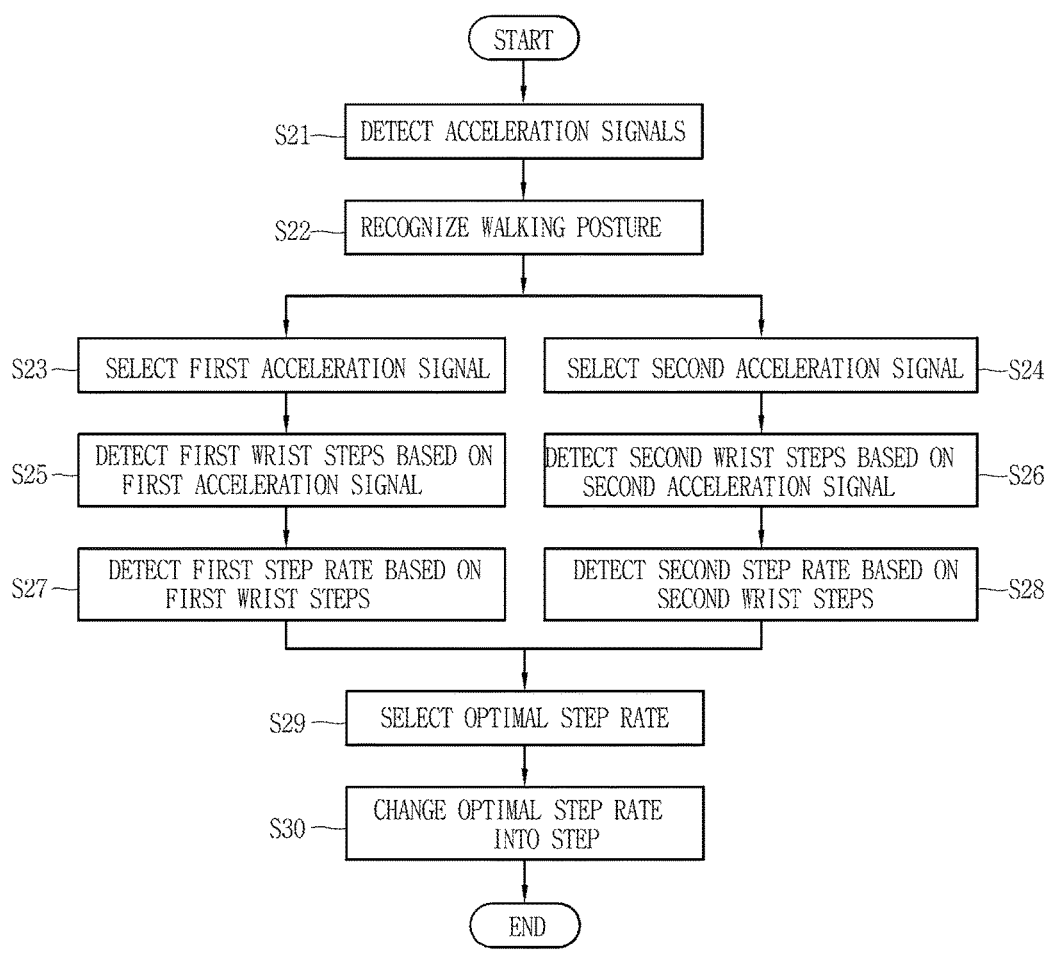
FIG. 6 is a flowchart illustrating a method for detecting wrist steps according to another exemplary embodiment.

FIG. 6 is a flowchart illustrating a method for detecting wrist steps according to another exemplary embodiment.

First, the acceleration sensor detects, in real time, a plurality of acceleration signals (e.g., three-axis (X-axis, Y-axis and Z-axis) acceleration signals), and outputs the plurality of detected acceleration signals to the controller 180 (S21).

The controller 180 recognizes, in real time, a current posture of the user in detecting steps (S22). For example, the controller 180 may recognize whether a user's current posture is a walking (or running) posture or a daily life pattern based on a signal pattern (signal form) of the plurality of real-time received acceleration signals (e.g., the three-axis (X-axis, Y-axis and Z-axis) acceleration signals) (S22). For example, when the user's current posture is the walking or running posture, the controller 180 detects a pattern of the plurality of acceleration signals (e.g., the three-axis (X-axis, Y-axis and Z-axis) acceleration signals) detected by the acceleration sensor, and previously stores, in the memory 170, the detected pattern as a walking or running posture pattern. If the signal pattern of a plurality of currently received acceleration signals is identical or similar to the previously stored walking posture pattern, the controller 180 recognizes that the user is currently in a walking posture. If the signal pattern of the plurality of currently received acceleration signals is identical or similar to the previously stored running posture pattern, the controller 180 recognizes that the user is currently in a running posture. If the signal pattern of the plurality of acceleration signals is different from the previously stored walking posture pattern or the previously stored running posture pattern, the controller 180 may recognize the user's current posture as associated with a daily life pattern, for example, a posture pattern for which steps may not be counted.

The controller 180 may detect, in real time, which axis among the X-axis, Y-axis and Z-axis the gravity axis is in the acceleration signals, to recognize whether the user walks in a state in which user's arms are lowered, whether the user is power-walking, whether the user takes an arm posture in walking or running, and the like. That is, the controller 180 may recognize, based on a change in the gravity axis among the acceleration signals, whether the user walks in a state in which user's arms are lowered, whether the user is power-walking, whether the user takes an arm posture in walking or running, and the like.

If the user's current posture is a walking or running posture, the controller 180 selects a predetermined first acceleration signal (e.g., an X-axis acceleration signal) among the plurality of received acceleration signals (S23).

If the user's current posture is a walking or running posture, the controller 180 selects a predetermined second acceleration signal (e.g., a Y-axis acceleration signal) among the plurality of received acceleration signals (S24).

If the user's current posture is a walking posture, the controller 180 selects acceleration signals having high step detection accuracy in the walking posture among the plurality of received acceleration signals. For example, if the user's current posture is a walking, the controller 180 may select the X-axis acceleration signal and the Y-axis acceleration signal among the plurality of received acceleration signals.

If the user's current posture is a running posture, the controller 180 selects acceleration signals having high step detection accuracy in the running posture among the plurality of received acceleration signals. For example, if the user's current posture is a running posture, the controller 180 may select the vector sum acceleration signal and the Z-axis acceleration signal among the plurality of received acceleration signals. That is, when the user's current posture is the walking posture, the acceleration signals (e.g., the X-axis acceleration signal and the Y-axis acceleration signal) selected among the plurality of acceleration signals may be different from those (e.g., the vector sum acceleration signal and the Z-axis signal) selected among the plurality of acceleration signals for a running posture.

In addition to receiving the X-axis, Y-axis and Z-axis acceleration signals, the controller 180 may obtain a vector sum of the X-axis, Y-axis and Z-axis acceleration signals, and select at least two signals among the obtained vector sum and of the X-axis, Y-axis and Z-axis acceleration signals. The controller 180 may generate a plurality of acceleration signals based on combinations of the obtained vector sum and the X-axis, Y-axis and Z-axis acceleration signals.

The controller 180 may select two or more optimal acceleration signals (e.g., the predetermined first and second acceleration signals) for detecting wrist steps among the plurality of acceleration signals generated based on the combinations of the X-axis, Y-axis and Z-axis acceleration signals and the obtained vector sum.

The controller 180 detects first wrist steps (first wrist step feature points) based on the predetermined first acceleration signal (S25). For example, the controller 180 detects, as the first wrist steps (first wrist step feature points), peak values exceeding a reference value for detecting wrist steps in the predetermined first acceleration signal.

The controller 180 detects second wrist steps (second wrist step feature points) based on the predetermined second acceleration signal (S26). For example, the controller 180 detects, as the second wrist steps (second wrist step feature points), peak values exceeding the reference value for detecting the wrist step in the predetermined second acceleration signal. For example, the controller 180 detects, as the first wrist steps (S1, S2, . . . ), peak values exceeding the reference value 4-3 for detecting the wrist step in the predetermined first acceleration signal 4-1. The controller 180 detects, as the second wrist steps (S1, S2, S3, . . . ), peak values exceeding the reference value 4-3 for detecting the wrist step in the predetermined second acceleration signal 4-2.

The controller 180 detects a first step rate (time period between steps) based on the first wrist steps (S27). For example, the controller 180 detects time periods T1, T2, T3, . . . between the first wrist steps, and obtains a first SD of the detected time periods (referred to as a first step rate).

The controller 180 detects a second step rate (time period between steps) based on the second wrist steps (S28). For example, the controller 180 detects time periods T1, T2, T3, T4, T5, T6, . . . between the second wrist steps, and obtains a second SD of the detected time periods (referred to as a second step rate).

The controller 180 compares the first SD with the second SD, and selects, as an optimal step rate, the second step rate corresponding to the second SD when the second SD is smaller than the first SD in the comparison result (S29). On the other hand, the controller 180 compares the first SD with the second SD, and selects, as an optimal step rate, the first step rate corresponding to the first SD when the first SD is smaller than the second SD in the comparison result. For example, if the first SD is greater than the second SD in a specific time period 4-4 while the steps S1 and S2 are being counted based on the first step rate, the controller counts steps (e.g., S3, S4 and S5) corresponding to the specific period using the second step rate, and subsequently counts a step S6 using the first step rate. The display unit 151 sequentially displays the counted steps on a screen.

The controller 180 changes the selected optimal step rate (e.g., the second step rate) as a step (S30), and calculates a number of paces based on the changed step. For example, the controller 180 changes the selected optimal step rate (e.g., the second step rate) into a number of steps, and calculates the changed number of steps (e.g., 100 steps) as a number of paces (e.g., 100 paces). The display unit 151 sequentially displays the number of paces on a screen.

If the user's posture is not a walking posture (or running posture) during a specific time period when the selected optimal step rate is changed into a number of steps, the controller 180 deletes a number of steps corresponding to the specific time period, thereby rolling back the total number of steps. This will be described with reference to FIG. 7.

Figure 7:
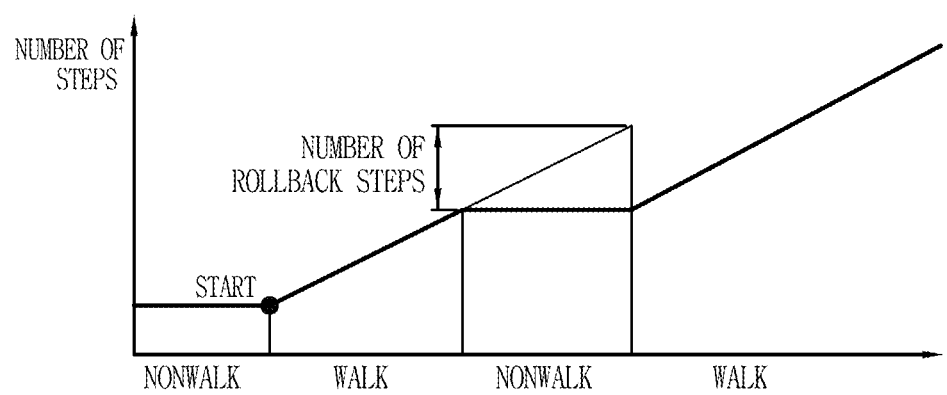
FIG. 7 is an exemplary diagram illustrating a process of rolling back the number of steps according to exemplary embodiments.

FIG. 7 is an exemplary diagram illustrating a process of rolling back the number of steps according to exemplary embodiments.

As shown in FIG. 7, the controller 180 changes the selected optimal step rate into a number of steps. If it is recognized that the user's posture during a specific time period is not a walking posture (or running posture) while the number of steps (e.g., 100 steps) is being displayed on the display unit 151, the controller 180 deletes the number of steps (e.g., 5 steps) detected in a particular time period (e.g., to display 95 steps, instead of 100 steps) on the display unit 151.

For example, the wrist step may be increased even when a user wearing an apparatus for detecting wrist steps moves his or her arms without walking. For example, the wrist step may be increased by vibration even when the user wearing the apparatus gets on a bus or public transportation. Thus, the controller 180 changes the selected optimal step rate into a number of steps. If the pattern of the acceleration signal is not a walking or running posture pattern but a daily life pattern while the number of steps (e.g., 100 steps) is being displayed on the display unit 151, the controller 180 rolls back the number of paces (number of steps), distance and calories. That is, if the pattern of the acceleration signal is not a walking or running posture pattern while steps are being sequentially counted the apparatus according to the exemplary embodiments deletes (corrects) the detected number of steps, thereby improving accuracy in detecting the number of user's steps.

The controller 180 may detect a distance based on the number of steps, and determines calories burned based on the detected distance. The method for detecting the distance and calories is a technique already known in the art, and therefore, its detailed description will be omitted.

As described above, in the apparatus and the method according to the exemplary embodiments, wrist steps are detected based on at least two acceleration signals among a plurality of acceleration signals corresponding to a plurality of axis directions, thereby exactly detecting user's wrist steps.

Further, in the apparatus and the method according to the exemplary embodiments, at least two acceleration signals among a plurality of acceleration signals corresponding to a plurality of axis directions are selected based on a user's walking or running posture, wrist steps are detected based on the selected at least two acceleration signals, thereby more exactly detecting user's wrist steps.

Various embodiments may be implemented using a machine-readable medium having instructions stored thereon for execution by a processor to perform various methods presented herein. Examples of possible machine-readable mediums include HDD(Hard Disk Drive), SSD (Solid State Disk), SDD(Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An apparatus that is wearable on a user's wrist for counting steps, the apparatus comprising:
   an acceleration sensor configured to detect a plurality of acceleration signals corresponding to a plurality of axial directions;
   a controller configured to detect a plurality of wrist step feature points that correspond to wrist steps in the plurality of acceleration signals, detect time periods between the plurality of wrist step feature points, select an acceleration signal among the plurality of acceleration signals based on a standard deviation (SD) of the time periods, and determine wrist steps corresponding to the selected acceleration signal; and
   a display configured to display the determined wrist steps,
   wherein the controller
      detects first wrist step feature points corresponding to a first acceleration signal among the plurality of acceleration signals,
      detects second wrist step feature points corresponding to a second acceleration signal among the plurality of acceleration signals,
      detects first time periods between the first wrist step feature points,
      detects second time periods between the second wrist step feature points, and
      selects the selected acceleration signal among the first and second acceleration signals based on a difference between a first SD of the first time periods and a second SD of the second time periods.

2. The apparatus of claim 1, wherein the plurality of acceleration signals include acceleration signals corresponding to X-axis, Y-axis and Z-axis directions, and combinations of acceleration signals corresponding to the X-axis, Y-axis and Z-axis directions.

3. The apparatus of claim 1, wherein the controller detects peak values of the plurality of acceleration signals as the plurality of wrist step feature points.

4. The apparatus of claim 1, wherein the selected acceleration signal is an acceleration signal having a minimum SD among the plurality of acceleration signals.

5. The apparatus of claim 1, wherein the selected acceleration signal is an acceleration signal having a minimum SD among the first and second SD.

6. The apparatus of claim 1, wherein, while the first wrist step feature points are being used to count wrist steps, when the first SD related to the first wrist step feature points is greater than the second SD related to the second wrist step feature points in a prescribed time period, the controller uses the second wrist step feature points to count wrist steps in the prescribed time period.

7. The apparatus of claim 1, wherein the controller detects wrist steps corresponding to peak values that exceed a reference value among peak values of the selected acceleration signal.

8. The apparatus of claim 1, wherein the controller recognizes whether a current posture of a user is a walking posture or a running posture based on a signal pattern of the plurality of acceleration signals.

9. The apparatus of claim 8, wherein, when the pattern of the plurality of acceleration signals corresponds to a previously stored walking posture pattern, the controller recognizes that the current posture is the walking posture, and
   wherein, when the pattern of the plurality of acceleration signals corresponds to a previously stored running posture pattern, the controller recognizes that the current posture is the running posture.

10. The apparatus of claim 8, wherein the controller recognizes whether the user's current posture is the walking or running posture based on a change in a gravitational axis among the plurality of acceleration signals.

11. The apparatus of claim 8, wherein, when the user's current posture is the walking or running postures, the controller detects wrist steps corresponding to the selected acceleration signal.

12. The apparatus of claim 11, wherein, when the user's current posture is not the walking or running postures during a prescribed time period while wrist steps are being detected, the controller deletes the wrist steps detected in the prescribed time period.

13. The apparatus of claim 8, wherein acceleration signals selected among the plurality of acceleration signals when the current posture is the walking posture are different from those selected among the plurality of acceleration signals when the current posture is the running posture.

14. A method for detecting wrist steps in a mobile terminal wearable on a user's wrist, the method comprising:
   detecting a plurality of acceleration signals corresponding to a plurality of axial directions;
   detecting a plurality of wrist step feature points that correspond to wrist steps in the plurality of acceleration signals;
   detecting time periods between the plurality of wrist step feature points;
   selecting an acceleration signal among the plurality of acceleration signals based on a standard deviation (SD) of the time periods;
   determining wrist steps corresponding to the selected acceleration signal; and
   displaying the wrist steps on a display,
   wherein the selecting of the acceleration signal includes
      detecting first wrist step feature points corresponding to a first acceleration signal among the plurality of acceleration signals,
      detecting second wrist step feature points corresponding to a second acceleration signal among the plurality of acceleration signals, detecting first time periods between the first wrist step feature points, detecting second time periods between the second wrist step feature points, and selecting the selected acceleration signal among the first and second acceleration signals based on a difference between a first SD of the first time periods and a second SD of the second time periods.

15. The method of claim 14, further comprising recognizing whether a current posture of a user is a walking posture or a running posture based on a signal pattern of the plurality of acceleration signals.

16. The method of claim 15, wherein the recognizing of whether the user's current posture is the walking or running postures Includes:

recognizing that the user's current posture is the walking posture when the pattern of the plurality of acceleration signals corresponds to a previously stored walking posture pattern; and recognizing that the user's current posture is the running posture when the pattern of the plurality of acceleration signals corresponds to a previously stored running posture pattern.

17. The method of claim 15, further comprising deleting wrist steps corresponding to a prescribed time period when the user's posture in the prescribed time period is not the walking or running postures.

* * * * *